(12) United States Patent
Ejiri

(10) Patent No.: US 7,826,361 B2
(45) Date of Patent: Nov. 2, 2010

(54) RADIO NETWORK CONTROL DEVICE AND QOS CONTROL METHOD USED FOR THE SAME

(75) Inventor: Satoru Ejiri, Tokyo (JP)

(73) Assignee: NEC Corporation, Tokyo (JP)

( * ) Notice: Subject to any disclaimer, the term of this patent is extended or adjusted under 35 U.S.C. 154(b) by 628 days.

(21) Appl. No.: 10/552,450

(22) PCT Filed: Apr. 6, 2004

(86) PCT No.: PCT/JP2004/004976
§ 371 (c)(1),
(2), (4) Date: Oct. 7, 2005

(87) PCT Pub. No.: WO2004/102905
PCT Pub. Date: Nov. 25, 2004

(65) Prior Publication Data
US 2006/0203754 A1    Sep. 14, 2006

(30) Foreign Application Priority Data
Apr. 9, 2003    (JP) .............................. 2003-104711

(51) Int. Cl.
*H04L 12/26*    (2006.01)
(52) U.S. Cl. ................. 370/231; 370/412; 370/444; 370/459; 370/469
(58) Field of Classification Search ................. 370/344, 370/347, 478, 477, 389, 521, 469
See application file for complete search history.

(56) References Cited
U.S. PATENT DOCUMENTS
4,682,150 A * 7/1987 Mathes et al. ................ 235/431

2001/0007137 A1    7/2001 Suumaki et al.
2003/0123392 A1*   7/2003 Ruutu et al. ................ 370/235
2003/0123485 A1*   7/2003 Yi et al. ...................... 370/477

FOREIGN PATENT DOCUMENTS

| JP | 2000-324174 A | 11/2000 |
| JP | 2002-539728 A | 11/2002 |
| WO | 01/93486 A2 | 12/2001 |
| WO | 02/19619 A2 | 3/2002 |
| WO | 02/098077 A1 | 12/2002 |

OTHER PUBLICATIONS

Keiji Tachikawa: W-CDMA Mobile Communication System 4-4 Packet Communication System, pp. 274-279, published by Maruzen, Co., Ltd., Jun. 25, 2001.

* cited by examiner

*Primary Examiner*—Seema S Rao
*Assistant Examiner*—Henry Baron
(74) *Attorney, Agent, or Firm*—Sughrue Mion, PLLC

(57) ABSTRACT

The block #1 capsules a user IP layer by a UDP/IPv6, as well as detecting a destination IP address and specifying a QoS class from a DSCP embedded in a TOS field of an IP header of the user IP layer to transfer data to the block #2 through a UDP port correlated to a corresponding link. The blocks #2 and #3 execute processing of protocols divided into functional blocks with respect to a payload part of a UDP packet obtained from each UDP port to transfer the data to its subsequent block through a UDP port correlated to a corresponding link. The block #4 embeds, into a TOS field of an IP header of an IP packet obtained from each link, a DSCP value of a QoS class correlated to the link.

12 Claims, 6 Drawing Sheets

RADIO NETWORK CONTROL DEVICE AND QOS CONTROL METHOD USED FOR THE SAME

BACKGROUNDS OF THE INVENTION

1. Field of the Invention

The present invention relates to a radio network controller and a QoS control method used therefor and, more particularly, to an RNC (Radio Network Controller) architecture appropriate for QoS (Quality of Service) control on an IP (Internet Protocol) based UTRAN (Universal Terrestrial Radio Access Network).

2. Description of the Related Art

FIG. 6 shows a protocol stack of a U (User)-plane when an IP based UTRAN directly connects to an IP network. Shown in FIG. 6 is a protocol stack among a base station (Node B), a radio network controller (RNC) and a router as nodes which form the UTRAN. Here, the U-plane is for transferring user information.

In FIG. 6, the base station (Node B) is connected to a user equipment (UE) through a PHY (physical layer) and to the radio network controller (RNC) through an L1 (Layer 1). Other than the above-described protocols, the base station (Node B) is provided with an FP (Frame Protocol), a UDP (User Datagram Protocol), an IP and an L2 (Layer 2).

The radio network controller (RNC) is connected to the base station (Node B) and the router through the L1 and is provided with, other than the above-described protocols, an IPv6 (Internet Protocol version 6), a PDCP (Packet Data Convergence Protocol), an RLC (Radio Link Control), a MAC (Medium Access Control), the FP, the UDP, the IP and the L2.

The router is connected to the radio network controller (RNC) and a core network (CN) not shown through the L1 and is provided with the IPv6 and the L2 other than the above-described protocols.

In conventional mobile communication networks whose representative is a GPRS (General Packet Radio Service), there exists as a user IP layer on the CN side, an SGSN (Serving GPRS Support Node)/GGSN (Gateway GPRS Support Node), which is capsuled by GTP (GPRS Tunneling Protocol) tunneling (see e.g. Keiji Tachikawa: W-CDMA Mobile Communication System 4-4 Packet Communication System, pp. 274-279, published by Maruzen, Co., Ltd., Jun. 25, 2001) and hidden on an UTRAN.

In the above-described IP based UTRAN, however, through the direct connection to an IP network, a user IP layer will be processed by the RNC to connect to the Node B through an IP transport. The above-described IP based UTRAN, therefore, QoS information added in the IP network needs to be reflected on the IP transport by the RNC.

Under these circumstances, an object of the present invention is to solve the above-described problems to provide a radio network controller which enables QoS control taking segmentation and concatenation on a layer basis into consideration and a QoS control method used therefor.

SUMMARY OF THE INVENTION

The radio network controller according to the present invention is a radio network controller formed of a plurality of protocol layers, which includes a plurality of blocks each having a protocol layer obtained by dividing the plurality of protocol layers and a UDP (User Datagram Protocol)/IPv6 (Internet Protocol version 6) layer which connects the plurality of blocks.

The QoS control method according to the present invention is a QoS (Quality of Service) control method of a radio network controller formed of a plurality of protocol layers, in which the plurality of protocol layers are divided into blocks such that QoS control is executed taking an RLC (Radio Link Control) layer which segments and concatenates U(User)-plane data into consideration and the blocks are connected by a UDP (User Datagram Protocol)/IPv6 (Internet Protocol version 6) layer.

In other words, the QoS control method of the present invention realizes QoS (Quality of Service) control of a DiffServ (Differentiated Services) system on a UTRAN (Universal Terrestrial Radio Access Network) to execute QoS control taking an RLC (Radio Link Control) layer which executes segmentation and concatenation of U(User)-plane data into consideration in QoS control in an RNC (Radio Network Controller). Here, DiffServ system QoS control is not minute QoS control such as ensuring a band or the like but control executed with rough priority.

More specifically, according to the QoS control method of the present invention, with blocks each different for each layer in an RNC, these blocks are connected by a UDP (User Datagram Protocol)/IPv6 (Internet Protocol version 6).

A UDP port which connects blocks is prepared for each channel (CH) down to a UE (User Equipment) as many as the number of QoS classes supported by one channel. UDP ports prepared between the blocks are one-to-one correlated to form a U-plane data path which is defined as a link.

Add a start packet and an end packet to the top and the rear of a PDU (Protocol Data Unit) group generated by segmentation and concatenation in an RLC layer to define a sandwiched part as a pack. Even when bridging blocks of other layers such as a MAC (Medium Access Control) and an FP (Frame Protocol), the pack can be identified by detecting a start packet and an end packet. Therefore, it is possible to execute QoS control on a pack basis in a last-stage IP (Internet Protocol) layer of an RNC.

According to the QoS control method of the present invention, thus noting a segmentation and concatenation function of an RLC protocol to define a pack on an RLC-PDU level not in an RLC but in other layer enables QoS control taking segmentation and concatenation for each layer into consideration.

DESCRIPTION OF THE PREFERRED EMBODIMENT

Next, an embodiment of the present invention will be described with reference to the drawings.

Figure 1:
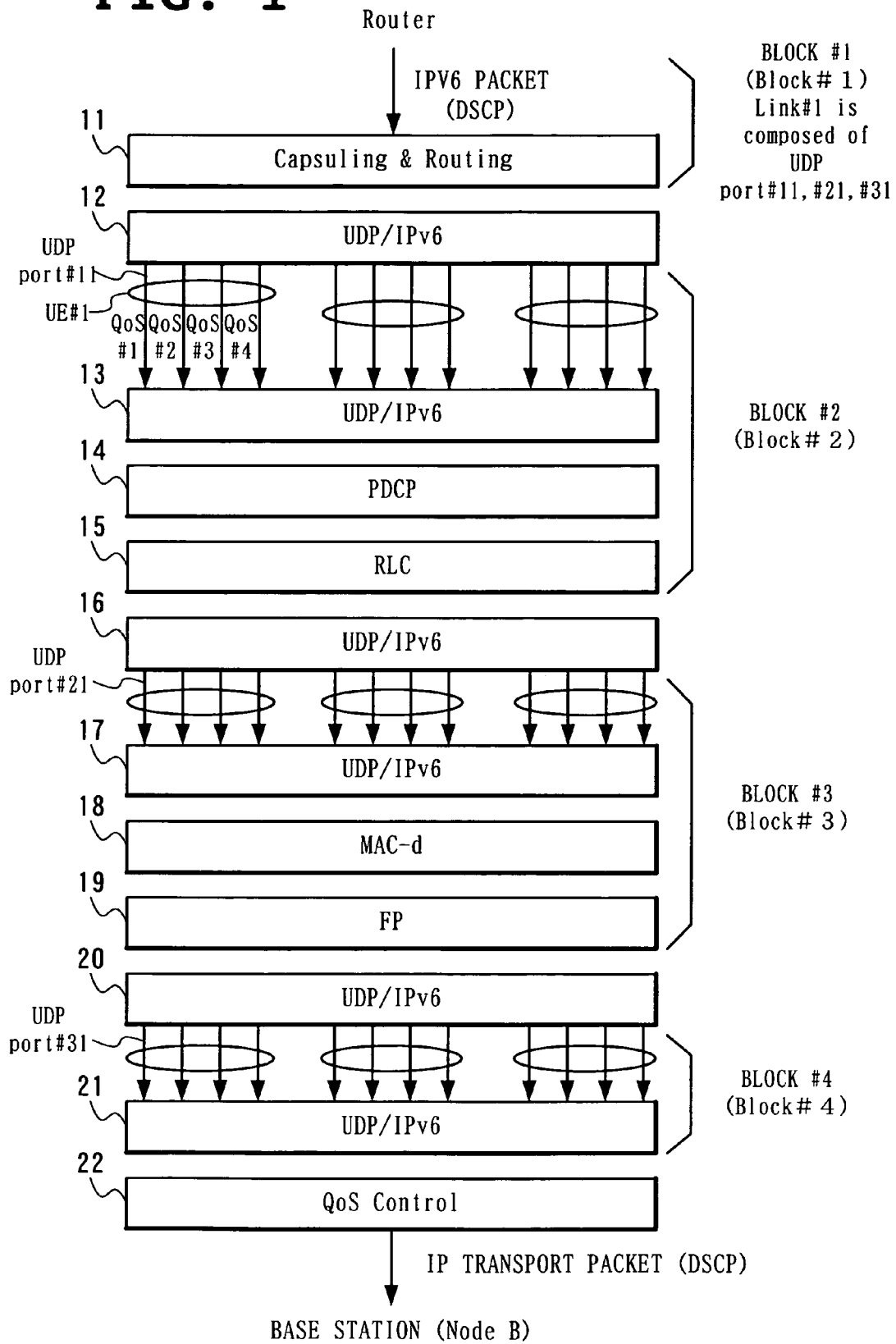
FIG. 1 is a functional block diagram showing a structure of a radio network controller (RNC) according to one embodiment of the present invention.

FIG. 1 is a functional block diagram showing a structure of a radio network controller (RNC) according to one embodiment of the present invention. In FIG. 1, illustrated is a functional block which processes U(User)-plane data of the radio network controller (RNC), in which the radio network controller (RNC) is formed of blocks #1 to #4 each different for each layer and a QoS control layer 22, with the blocks #1 to #4 connected by a UDP (User Datagram Protocol)/IPv6 (Internet Protocol version 6).

UDP ports #11, #21 and #31 which connect the blocks #1 to #4 are each prepared for each channel (CH) down to a UE (User Equipment) as many as the number of QoS (Quality of Service) classes supported by one channel. The UDP ports #11, #21 and #31 prepared among the blocks #1 to #4 are one-to-one correlated to form a U-plane data path which is defined as a link.

The block #1 includes a capsuling and routing layer 11, which capsules a user IP layer by the UDP/IPv6, as well as detecting a destination IP address (which will be an IP address of a relevant UE), and specifying a QoS class from a DSCP (Differentiated Services Code Point) embedded in a TOS (Type of Service) field of an IP header of the user IP layer to transfer data to the block #2 through the UDP port correlated to a corresponding link.

The block #2 includes a UDP/IPv6 layer 13, a PDCP (Packet Data Convergence Protocol) layer 14 and a RLC (Radio Link Control) layer 15 and the block #3 includes a UDP/IPv6 layer 17, a MAC (Medium Access Control)-d layer 18 and an FP (Frame Protocol) layer 19.

The blocks #2 and #3 execute protocol processing divided for each of the functional blocks (the processing of the PDCP layer 14 and the RLC layer 15 for the block #2 and the processing of the MAC-d layer 18 and the FP layer 19 for the block #3) with respect to a payload part of a UDP packet obtained through each UDP port to transfer data to a block at a subsequent stage through a UDP port correlated to a corresponding link.

The block #4 includes a UDP/IPv6 layer 21, which embeds, in a TOS field of an IP header of an IP packet obtained from each link, a DSCP value of a QoS class correlated to the link. The QoS control layer 22 executes QoS control based on a DSCP value.

Between the block #1 and the block #2, between the block #2 and the block #3 and between the block #3 and the block #4, UDP/IPv6 layers 12, 16 and 20 are provided, respectively.

Figure 2:
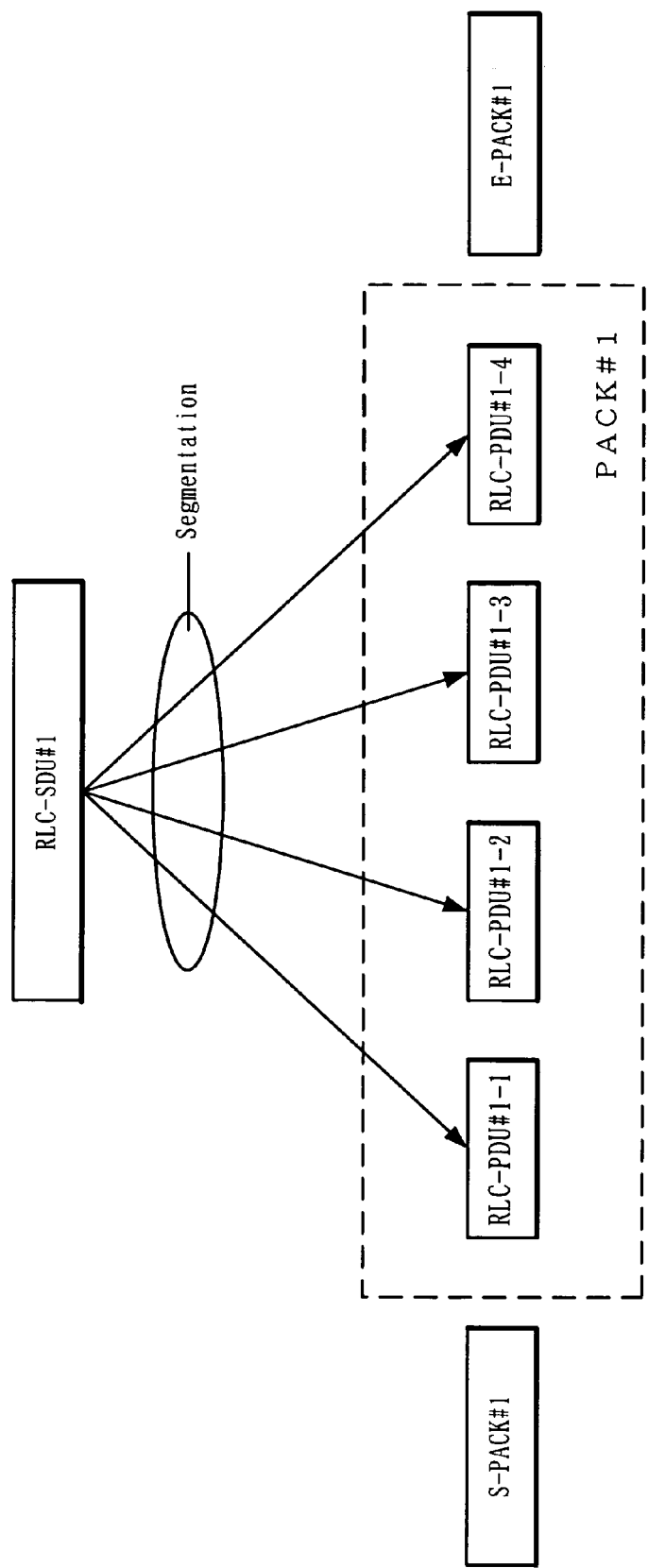
FIG. 2 is a diagram showing U-plane data segmentation processing at the radio network controller (RNC) according to one embodiment of the present invention.
Figure 3:
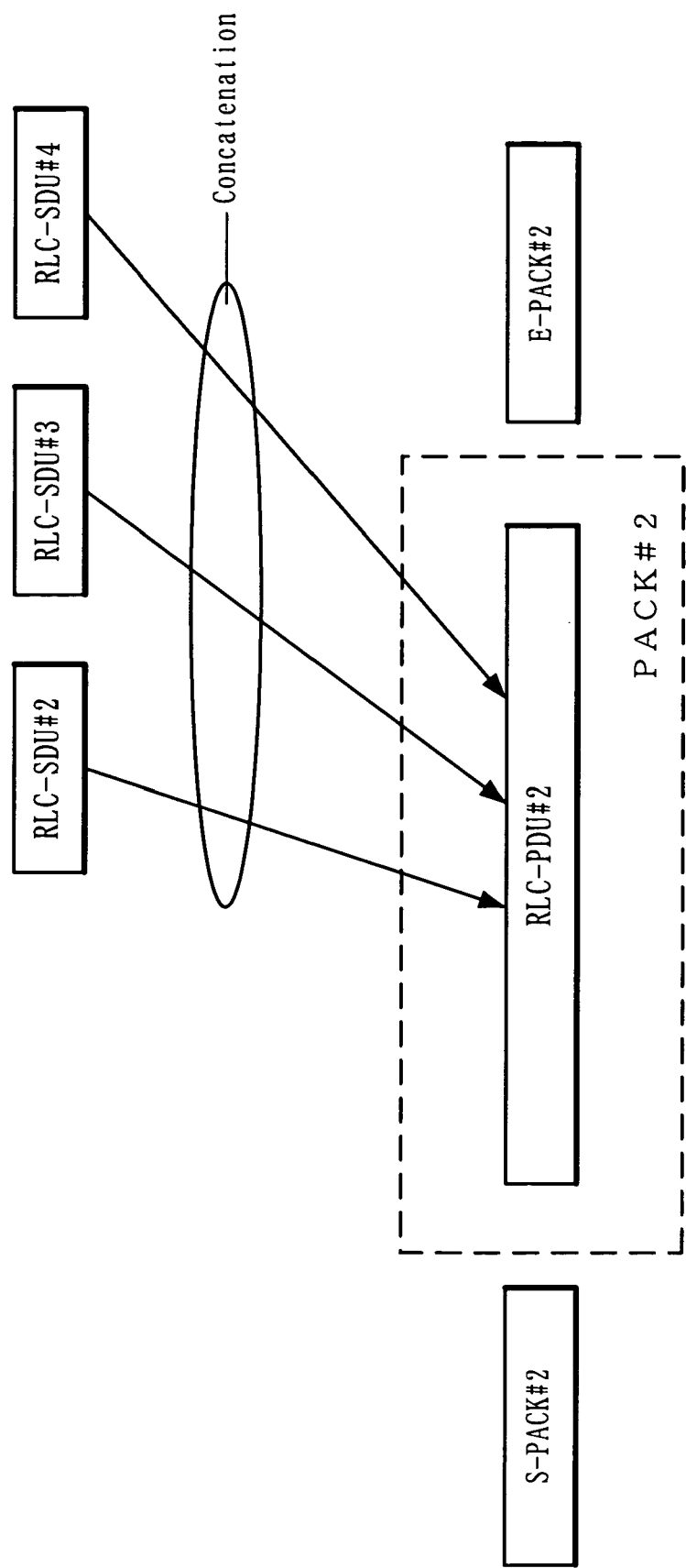
FIG. 3 is a diagram showing U-plane data concatenation processing at the radio network controller (RNC) according to one embodiment of the present invention.
Figure 4:
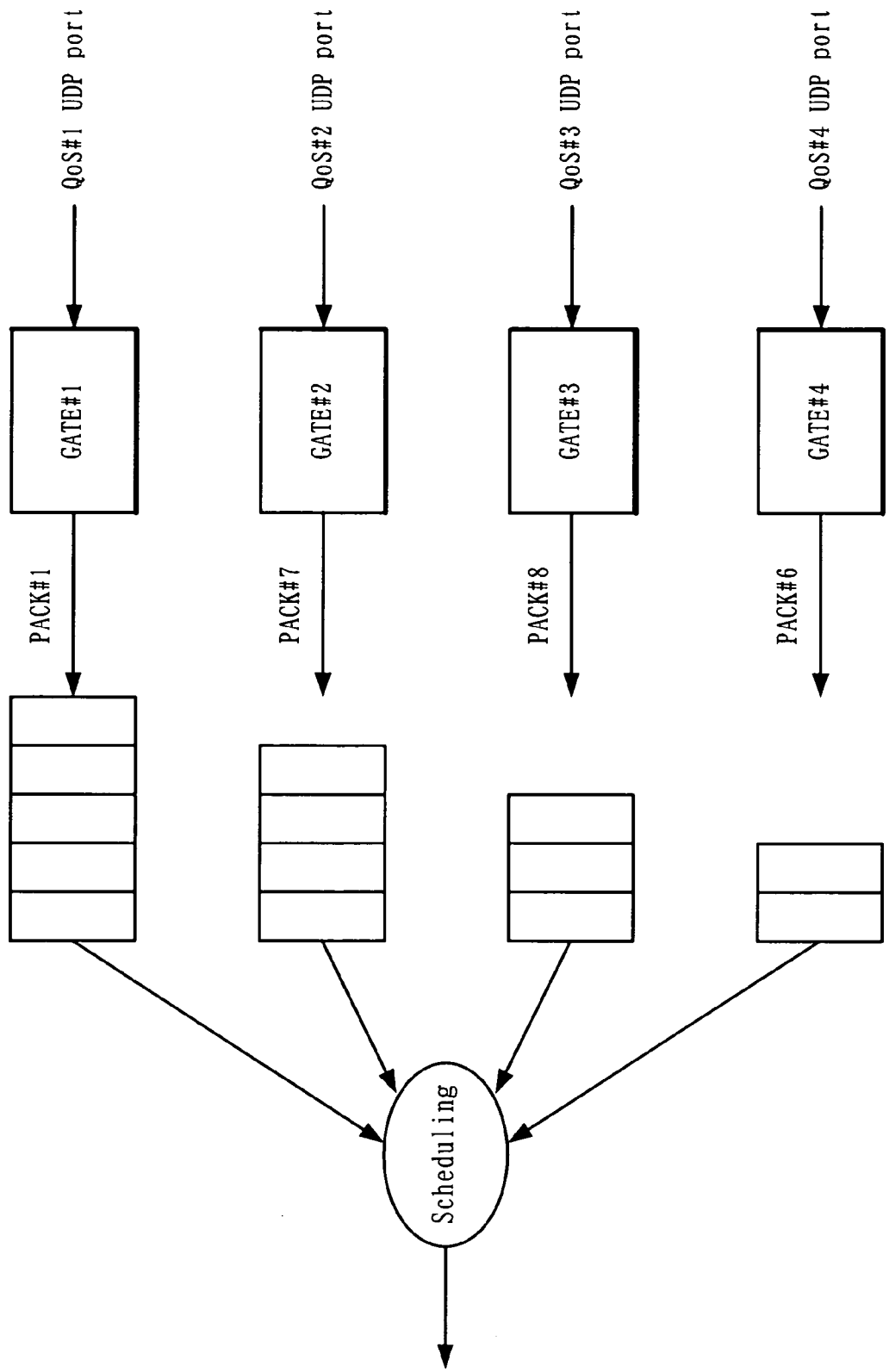
FIG. 4 is a diagram showing QoS control at the radio network controller (RNC) according to one embodiment of the present invention.

FIG. 2 is a diagram showing U-plane data segmentation processing in the radio network controller (RNC) according to one embodiment of the present invention, FIG. 3 is a diagram showing U-plane data concatenation processing in the radio network controller (RNC) according to one embodiment of the present invention, and FIG. 4 is a diagram showing QoS control in the radio network controller (RNC) according to one embodiment of the present invention. Description will be made of operation of the radio network controller (RNC) according to one embodiment of the present invention with reference to FIG. 1 to FIG. 4.

When U-plane data segmentation and concatenation are executed at the RLC layer 15 of the block #2, operation will be as shown in FIG. 2 and FIG. 3. In a case of segmentation of U-plane data, at the top of a divided PDU group (RLC-PDU#1-1~RLC-PDU#1-4), a special start packet (S-PACK#1) is inserted and at the rear of the PDU group, a special end packet (E-PACK#1) is inserted [see FIG. 2].

In a case of concatenation of U-plane data, a special start packet (S-PACK#2) and a special end packet (E-PACK#2) are inserted preceding to and succeeding to a generated PDU (RLC-PDU#2) after concatenation [see FIG. 3].

Units sandwiched between these special start packets (S-PACK#1 and #2) and these special end packets (E-PACK#1, #2) will be defined as PACK #1 and PACK #2, respectively.

QoS control in the block #4 is executed on a basis of the above-described PACK#1 or PACK#2. More specifically, as shown in FIG. 4, at a preceding stage of a QoS scheduler, a filter function (GATE#1~GATE#4) on a basis of a PACK called a GATE is prepared to detect a special start packet (S-PACK) and a special end packet (E-PACK) from U-plane data received from a corresponding UDP port (QoS#1 UDP port~QoS#4 UDP port).

When detecting existence of a special start packet (S-PACK) and a special end packet (E-PACK), compare its PACK size and a free capacity of a corresponding QoS buffer. As a result of the comparison, when input is allowable, input a PACK (#1, #6, #7, #8) with the special start packet (S-PACK) and the special end packet (E-PACK) excluded to the buffer and when input is not allowed, abandon the PACK (#1, #6, #7, #8).

Figure 5:
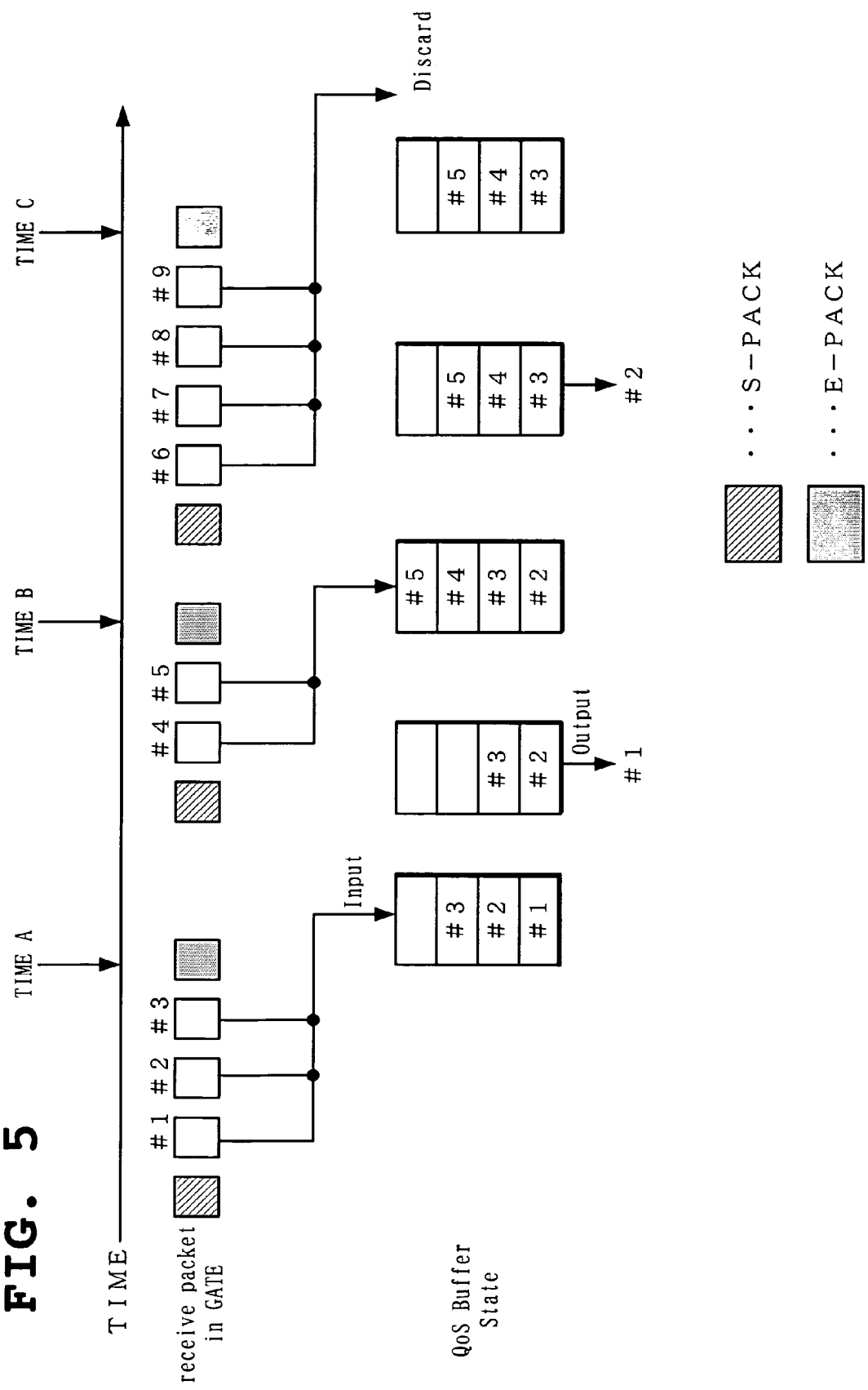
FIG. 5 is a diagram showing operation of GATE in a case where QoS control is executed on a pack basis according to one embodiment of the present invention.
Figure 6:
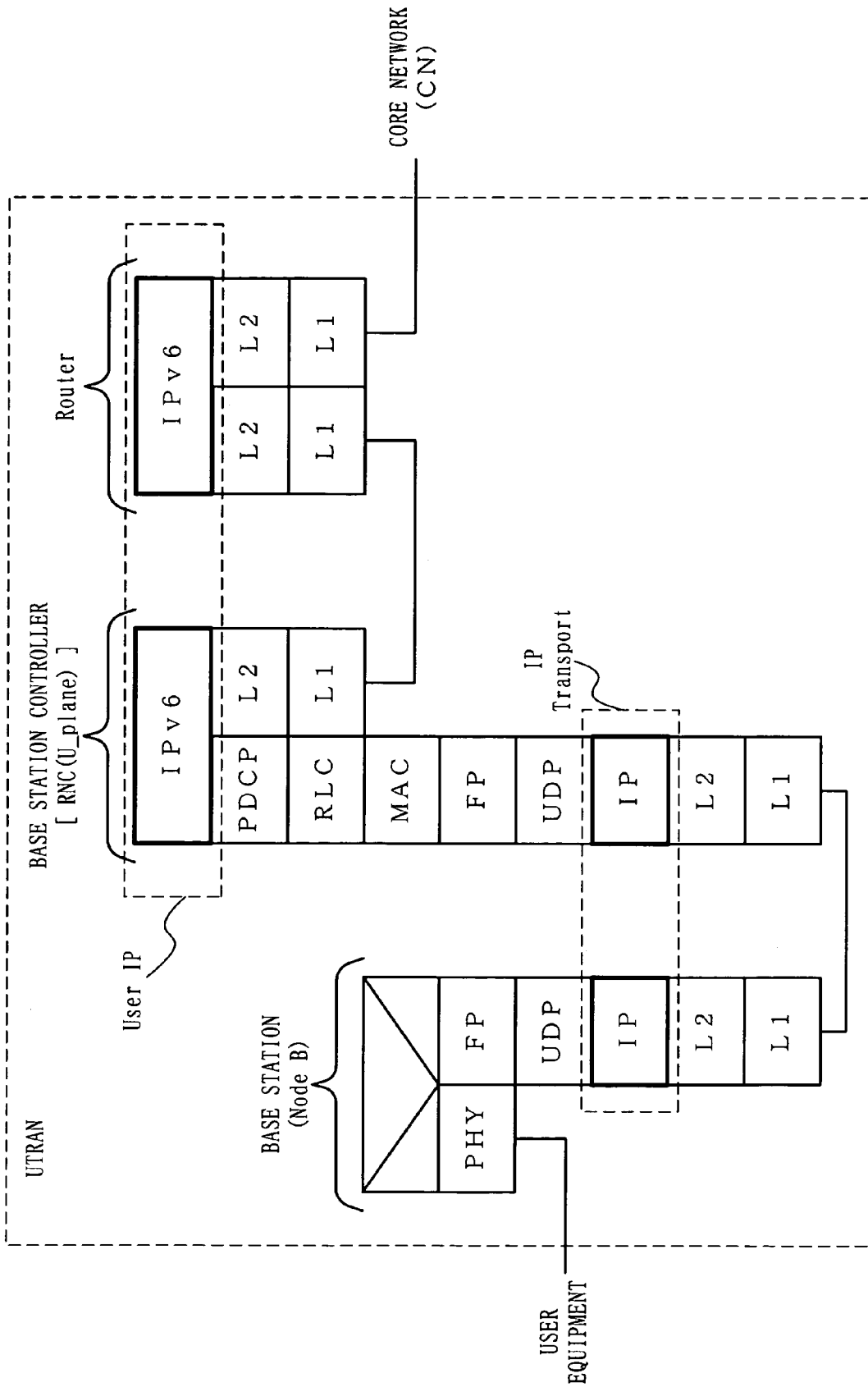
FIG. 6 is a diagram showing a protocol stack of a U-plane in a case where an IP based UTRAN is directly connected to an IP network.

FIG. 5 is a diagram showing operation of a GATE when QoS control is executed on a pack basis according to one embodiment of the present invention. As shown in FIG. 5, when receiving a packet according to a time axis, detect an end packet (E-PACK) to identify one pack at Time A, and because input is allowed as a result of comparison between the size of the one pack and a free capacity of the QoS buffer, the real packets #1, #2 and #3 in the pack are input to the QoS buffer.

At Time B, detect an end packet (E-PACK) to identify one pack, and because input is allowed as a result of comparison between the size of one pack and a free capacity of the QoS buffer, the real packets #4 and #5 in the pack are input to the QoS buffer. Here, during the transition from Time A to Time B, QoS buffer output timing by the scheduler exists to increase a free capacity of the QoS buffer. As a result, input is allowed, so that the real packets #4 and #5 in the pack are input to the QoS buffer.

At time C, detect an end packet (E-PACK) to identify one pack and because input is not allowed as a result of comparison between the size of one pack and a free capacity of the QoS buffer, the real packets #6 to #9 in the pack are abandoned. Here, during the transition from Time B to Time C, QoS buffer output timing by the scheduler exists to increase a free capacity of the QoS buffer. However, since the detected one pack size of free capacity is yet to be obtained, the real packets #6, #7, #8 and #9 in one pack are all abandoned.

Thus, by setting a logical path called a link for each user equipment (UE) and each QoS class, that is, for each service, between blocks, the present embodiment enables QoS control in the device only through management of a UDP port number in the device, which leads to simplification of QoS control in the device.

Although a sequence number is assigned to each RLC-PDU by a segmentation function of an RLC, only a part of the segmented RLC-PDU is abandoned by conventional QoS control by an IP layer of a DiffServ system, so that all the other RLC-PDU will be abandoned at the time of synthesis at a user equipment, resulting in degrading transmission quality. According to the present embodiment, however, abandonment is made on a PACK basis to prevent abandonment of an RLC-PDU due to synthesis of RLC-PDU of a user equipment.

In the present embodiment, since the blocks #1 to #4 are segmented for each layer and the blocks #1 to #4 are connected by the UDP/IPv6 layers 12, 13, 16, 17, 20 and 21, the respective blocks #1 to #4 can be formed of a hardware (H/W) package to enable the number of accommodated channels to be increased by package expansion.

Accordingly, although the present embodiment defines a pack on an RLC-PDU level noting the segmentation and concatenation function of the RLC protocol, defining a pack not in an RLC but in other layer enables QoS control taking segmentation and concatenation of the layer into consideration.

As described in the foregoing, being thus structured and being operable, the present invention obtains an effect of executing QoS control taking segmentation and concatenation for each layer into consideration.

The invention claimed is:

1. A radio network controller for executing Quality of Service (QoS) control, the radio network controller including a plurality of protocol layers, which comprises a plurality of blocks each formed of protocol layers obtained by segmenting said plurality of protocol layers,
    wherein said plurality of blocks comprises at least two blocks of a first block and a second block, and wherein the first block and second block are connected by a User Datagram Protocol (UDP)/Internet Protocol version 6 (IPv6) layer arranged there between,
    wherein said plurality of protocol layers are segmented to execute Quality of Service (QoS) control by buffering at least one of RLC layer segmentation and concatenation data, and
wherein said first block and second block include at least a Packet Data Convergence Protocol (PDCP) layer, an RLC (Radio Link Control) layer which executes U (User)-plane data segmentation and concatenation, a MAC (Medium Access Control) layer and a FP (Frame Protocol) layer.

2. The radio network controller according to claim 1, wherein the buffering RLC layer segmentation or concatenation data comprises a filtering function for detecting a start packet and an end packet each set in advance from said U-plane data to buffer RLC layer segmentation and concatenation data including said start packet and end packet to a buffer or abandon the RLC layer segmentation and concatenation data according to the detection result.

3. A Quality of Service (QoS) control method of a radio network controller including a plurality of protocol layers, where said plurality of protocol layers are segmented into blocks to execute QoS control taking a Radio Link Control (RLC) layer which executes at least one of User (U)-plane data segmentation and concatenation,
    wherein said plurality of blocks comprises at least two blocks of a first block and a second block, and wherein the first block and the second block are connected by a User Datagram Protocol (UDP)/Internet Protocol version 6 (IPv6) layer arranged therebetween,
    wherein said first block and second block include at least a Packet Data Convergence Protocol (PDCP) layer, a Radio Link Control (RLC) layer which executes U (User)-plane data segmentation and concatenation, a MAC (Medium Access Control) layer and an FP (Frame Protocol) layer, and
    wherein said plurality of protocol layers are segmented to execute Quality of Service (QoS) control by buffering at least one of RLC layer segmentation and concatenation data.

4. The QoS control method according to claim 3, wherein by the control of a filtering function of detecting a start packet and an end packet each set in advance from said U-plane data, data with said start packet and end packet excluded is input to a buffer and abandoned according to the detection result.

5. The radio network controller according to claim 1, wherein said plurality of blocks comprises at least three of said blocks, wherein each of said plurality of blocks are connected by one of a plurality of UDP/IPv6 layers comprising said UDP/IPv6 layer.

6. The QoS control method according to claim 3, wherein said plurality of blocks comprises at least three of said blocks, wherein each of said plurality of blocks are connected by one of a plurality of UDP/IPv6 layers comprising said UDP/IPv6 layer.

7. The radio network controller according to claim 1, wherein the QoS control is executed based on the U-plane data segmentation and concatenation executed in the RLC layer.

8. The QoS control method according to claim 3, wherein the QoS control is executed based on the U-plane data segmentation and concatenation executed in the RLC layer.

9. The radio network controller according to claim 1, further comprising a filtering function which detects a start packet and an end packet in said U-plane data, performs a comparison between a size of input data which exists between the start and end packets and a free capacity of a Quality of Service (QoS) buffer, and allows or abandons the input data based on a result of the comparison.

10. The QoS control method according to claim 3, further comprising:
    detecting a start packet and an end packet in said U-plane data;
    performing a comparison between a size of input data which exists between the start and end packets and a free capacity of a QoS buffer; and
    allowing or abandoning the input data based on a result of the comparison.

11. The radio network controller according to claim 9, wherein the filtering function allows the input data to be input to the QoS buffer if the size of the input data is smaller than the free capacity of the QoS buffer, and abandons the input data if the size of the input data is larger than the free capacity of the QoS buffer.

12. The QoS control method according to claim 10, wherein the allowing of the input data comprises allowing the input data to be input to the QoS buffer if the size of the input data is smaller than the free capacity of the QoS buffer, and the abandoning of the input data is performed if the size of the input data is larger than the free capacity of the QoS buffer.

* * * * *